United States Patent
Marchini et al.

(10) Patent No.: US 8,246,897 B2
(45) Date of Patent: Aug. 21, 2012

(54) METHOD AND APPARTUS FOR THE VULCANISATION OF TYRES FOR VEHICLE WHEELS

(75) Inventors: Maurizio Marchini, Milan (IT); Fiorenzo Mariani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 210 days.

(21) Appl. No.: 11/988,920

(22) PCT Filed: Jul. 29, 2005

(86) PCT No.: PCT/IT2005/000460
§ 371 (c)(1),
(2), (4) Date: Jan. 17, 2008

(87) PCT Pub. No.: WO2007/013112
PCT Pub. Date: Feb. 1, 2007

(65) Prior Publication Data
US 2009/0121395 A1 May 14, 2009

(51) Int. Cl.
*B29C 35/02* (2006.01)
(52) U.S. Cl. .................................. 264/552; 425/34.1
(58) Field of Classification Search .................. 264/552, 264/297.5, 501
See application file for complete search history.

(56) References Cited

U.S. PATENT DOCUMENTS

| 4,268,219 | A | 5/1981 | Nakagawa et al. |
| 6,322,342 | B1 | 11/2001 | Mitamura |
| 6,508,640 | B1 | 1/2003 | Irie |
| 6,921,446 | B2 | 7/2005 | Takagi |

FOREIGN PATENT DOCUMENTS

| EP | 0 435 555 A2 | 7/1991 |
| EP | 0 578 104 A2 | 1/1994 |
| EP | 0 604 984 A1 | 7/1994 |
| EP | 0 976 533 B1 | 2/2000 |
| EP | 1 066 952 B1 | 1/2001 |
| WO | WO 2004/045837 A1 | 6/2004 |

*Primary Examiner* — Christina Johnson
*Assistant Examiner* — Xue Liu
(74) *Attorney, Agent, or Firm* — Finnegan, Henderson, Farabow, Garrett & Dunner, L.L.P.

(57) ABSTRACT

A vulcanization apparatus and method for vehicle wheel tires, includes at least one prevulcanization work station to conduct a prevulcanization of a radially internal portion of the tire and at least two vulcanization work stations wherein the remaining part of the vulcanization of the whole tire is carried out.

14 Claims, 3 Drawing Sheets

METHOD AND APPARTUS FOR THE VULCANISATION OF TYRES FOR VEHICLE WHEELS

CROSS REFERENCE TO RELATED APPLICATION

This application is a national phase application based on PCT/IT2005/000460, filed Jul. 29, 2005, the content of which is incorporated herein by reference.

BACKGROUND OF THE INVENTION

The present invention relates to a method and an apparatus for the vulcanisation of tyres for vehicle wheels.

In particular, the present invention relates to method and apparatus for the vulcanisation of tyres built on a toroidal support.

TECHNICAL STATE OF THE ART

The tyre production cycle provides that, after a building process wherein the different components of the tyre are made and/or assembled, a molding and vulcanisation process is carried out which aims at defining the tyre structure, according to a desired geometry and tread pattern.

For this purpose, the tyre is closed inside a molding cavity, having a suitable configuration, defined internally of a vulcanisation mold and shaped according to the requirements of the tyre to be obtained.

A tyre generally comprises a toroidally ring-shaped carcass including one or more carcass plies, strengthened with reinforcing cords, lying in substantially radial planes, (a radial plane contains the rotation axis of the tyre). Each carcass ply has its ends integrally associated with at least one metal annular reinforcing structure, usually known as bead core, constituting the reinforcing at the beads, i.e. at the radially internal ends of the tyre, the function of which is to enable assembling of the tyre with a corresponding mounting rim. Placed crown wise to said carcass is a band of elastomer material, called tread band, in which, at the end of the vulcanisation and molding steps, a raised pattern is formed for ground contact. A reinforcing structure usually known as belt structure is placed between the carcass and the tread band. In the case of car tyres, this structure usually comprises at least two radially superposed strips of rubberised fabric provided with reinforcing cords, generally of metal material, positioned parallel to each other in each strip and in a crossed relationship with the cords of the adjacent strip preferably symmetrically arranged with respect to the equatorial plane of the tyre. Preferably said belt structure further comprises at a radially external position thereof, at least on the ends of the underlying strips, also a third layer of textile or metallic cords, circumferentially disposed (at 0 degrees).

Finally, in tyres of the tubeless type, i.e. devoid of an air tube, a radially internal layer, called liner, is present which has imperviousness features to ensure the air-tightness of the tyre.

To the aims of the present description as well as in the following claims, by the term "elastomer material" it is intended a composition comprising at least one elastomer polymer and at least one reinforcing filler. Preferably this composition further comprises additives such as cross-linking and/or plasticizing agents. By virtue of the cross-linking agents, this material can be cross-linked through heating so as to form the final manufactured article.

EP 1 066 952 A1 describes a method and an apparatus for the vulcanisation of tyres. More precisely, a plurality of lines of vulcanisation stations which contain a plurality of series of mobile tyre mold units for tyre vulcanisation is disclosed; a mold opening/closing station through which the vulcanised tyre is removed, and a green tyre is inserted; a first mold transferring device and a second mold transferring device positioned between the mold opening/closing station and the tyre vulcanisation station for the transfer of the tyre mold units.

There are molding and vulcanising methods in which a green tyre put on a rigid toroidal support is arranged within the mold. Said methods are preferably employed for tyres which, according to recent building processes, are produced starting from a limited number of elementary semifinished products fed onto a toroidal support whose outer profile coincides with that of the radially internal surface of the tyre that is wished to be produced. Said toroidal support is moved, preferably by means of a robotized system, among a plurality of workstations in each of which, through automated sequences, a particular building step of the tyre is carried out.

For example, the European Patent Application published under No 0 976 533, in the name of the same Applicant, discloses a method and an apparatus for molding and curing tyres for vehicle wheels of the aforesaid type, wherein a green tyre built on a toroidal support is closed inside a vulcanisation mold; subsequently steam or other pressurised fluid is fed into at least one gap for fluid diffusion created between the external surface of the toroidal support and the internal surface of the tyre.

In these cases, at the end of the molding and vulcanisation steps, the tyre thus obtained may sometimes exhibit some faults. Because of the absence of the vulcanisation bladder, the various components of the elastomer material which are still in an uncured state, i.e. in a plastic state, may be displaced in an anomalous manner with respect to the design specifications, as a result of the rust exercised by the pressurised working fluid introduced between the external surface of the toroidal support and the internal surface of the green tyre. In particular, the carcass ply or plies can move away and slip out from heir position in the bead region because of the expansion to which the tyre is subjected by said working fluid. In this way, the tensioning of the carcass ply or plies determined by the molding step is lower than it is provided to be for the finished tyre.

In order to overcome these drawbacks the International Patent Application published under No. WO 2004/045837, in the name of the same Applicant, discloses a method and an apparatus which, by pressing the green tyre from the outside towards the inside, and simultaneously supplying heat to the internal surface of the said tyre, at least a partial vulcanisation of the radially innermost layer of the tyre and of the bead region is obtained, so that a molding and vulcanisation step, which does not result in irregularities or lack of homogeneity in the finished tyre, can be subsequently performed.

In order to carry out said partial vulcanisation, at least a pressurised primary working fluid, suitably heated to supply the heat necessary for the aforesaid partial vulcanisation, and at least a pressurised secondary working fluid are preferably used. The Applicant has perceived that for this reason the apparatuses necessary for accomplishing said partial vulcanisation are provided with multiple connectors for said working fluids and that therefore they results as being complex and expensive.

The Applicant has also ascertained that said connectors are present on each work station, that is, at each mold of the vulcanisation apparatus, even though they are used only during the prevulcanisation step and therefore they are not used for most of the vulcanisation method.

In a similar manner, the Applicant has found the presence of further components present in the vulcanisation apparatus which are used only during some of the tyre vulcanisation steps, which therefore result unused for a quite long period of time. An example of this kind of apparatus is the heating device of the vulcanisation mold used only during the tyre vulcanisation step.

The Applicant has noted that by providing a vulcanisation apparatus which realises a vulcanisation method of the type shown in patent No WO 2004/045837, it is possible to simplify and reduce the cost of the aforesaid apparatus, by reducing the number of the more expensive components (for example, those related to the supply of the secondary working fluid and/or those concerning the heating of the mold), while maintaining constant the productive capacity of the same vulcanisation apparatus, by means of a rational use of said apparatuses, increasing the operating time thereof in the vulcanisation cycle.

Therefore the object of the present invention is to provide a vulcanisation method for vehicle wheel tyres which allows to achieve the maximum utilisation degree of the devices associated with each work station while the same method is carried out.

Another object of the present invention is to provide a vulcanisation apparatus for vehicle wheel tyres built on a toroidal support provided with a plurality of work stations, each one being equipped with the minimum number of devices required for the specific operation, to be performed, in order to reduce the costs for carrying out the apparatus.

SUMMARY OF THE INVENTION

The Applicant has found that by carrying out a vulcanisation method which uses at least one prevulcanisation work station wherein a prevulcanisation of the radially internal portion of the tyre and in case a molding and a partial vulcanisation of the whole tyre, and at least two vulcanisation work stations wherein the remaining part of the vulcanisation of the whole tyre is carried out, it is possible to retain the apparatuses necessary for supplying the above said primary and secondary working fluids at the prevulcanisation work station, while retaining only the apparatuses for primary working fluid at to the vulcanisation stations, thus obtaining the maximum utilisation degree of the apparatuses available during the same method.

According to a first aspect, the invention relates to a vulcanisation method for vehicle wheel tyres comprising the following steps:
a) placing a green tyre, arranged on a toroidal support, inside a vulcanisation mold which may be operably associated with a plurality of work stations defined in at least one vulcanisation module;
b) closing said vulcanisation mold;
c) connecting a supplying device of at least one pressurised primary working fluid and a supplying device of at least one pressurised secondary working fluid to the vulcanisation mold in a prevulcanisation station;
d) at least partially vulcanising a radially internal portion of the green tyre on the toroidal support by pressing a radially internal surface of said green tyre towards an external surface of the toroidal support by means of said pressurised secondary working fluid, supplying heat to said portion of the tyre;
e) molding and continuing the vulcanisation of the aforesaid tyre by supplying at least one pressurised primary working fluid inside the toroidal support pressing a radially external surface of the green tyre towards the internal walls of the vulcanisation mold;
f) disconnecting the supplying device of said at least one pressurised primary working fluid and the supplying device of said at least one pressurised secondary working fluid from the vulcanisation mold;
g) transferring the mold to a vulcanisation station;
h) connecting a respective supplying device of at least one pressurised primary working fluid to the vulcanisation mold in said vulcanisation station;
i) continuing the vulcanisation of the tyre molded and prevulcanised during steps d) and e), by supplying said at least one pressurised primary working fluid inside the toroidal support, pressing a radially external surface of the green tyre towards the internal walls of the vulcanisation mold and supplying heat to the aforesaid tyre;
j) disconnecting the supplying device of said at least one pressurised primary working fluid;
k) transferring the mold to at least one further vulcanisation station;
l) carrying out the steps h), i), j) and in case k) until the vulcanisation method has been completed;
m) opening said mold and unloading the vulcanised tyre from the vulcanisation mold.

In a second aspect, the invention relates to a vulcanisation apparatus for vehicle wheel tyres, comprising at least one vulcanisation module wherein it is defined a plurality of work stations which may be operably associated with a plurality of vulcanisation molds each containing a green tyre being processed arranged on a respective toroidal support, said vulcanisation module comprising the following work stations:
at least one prevulcanisation station provided with a supplying device of at least one pressurised primary working fluid and a supplying device of at least one pressurised secondary working fluid inside a vulcanisation mold placed in said station, said pressurised secondary working fluid being adapted to press a radially internal surface of said green tyre towards an external surface of the toroidal support, said pressurised primary working fluid being adapted to press a radially external surface of the green tyre towards the internal walls of the vulcanisation mold;
at least two vulcanisation stations provided with a respective supplying device of said at least one pressurised primary working fluid inside one vulcanisation mold placed in said stations, said pressurised primary working fluid being adapted to press said external surface of the green tyre towards the internal walls of the vulcanisation mold so as to continue the vulcanisation of the partially vulcanised tyre;
at least one transfer device adapted to transfer sequentially each vulcanisation mold of said plurality of molds from one work station to the subsequent one;
at least one moving device adapted to pick up a vulcanised tyre arranged on the respective toroidal support from said at least one vulcanisation module and to place a green tyre arranged on the respective toroidal support in said at least one vulcanisation module;
at least one mold opening and closing device for unloading the vulcanised tyre and subsequentially loading a green tyre inside a vulcanisation mold.

BRIEF DESCRIPTION OF THE FIGURES

Further characteristics and advantages of the invention will be more apparent from the following description of some preferred embodiments of vulcanisation apparatuses and methods according to the invention, provided as a non-limiting example, with reference to the appended drawings wherein.

DETAILED DESCRIPTION OF THE PREFERRED EMBODIMENTS

Figure 1:
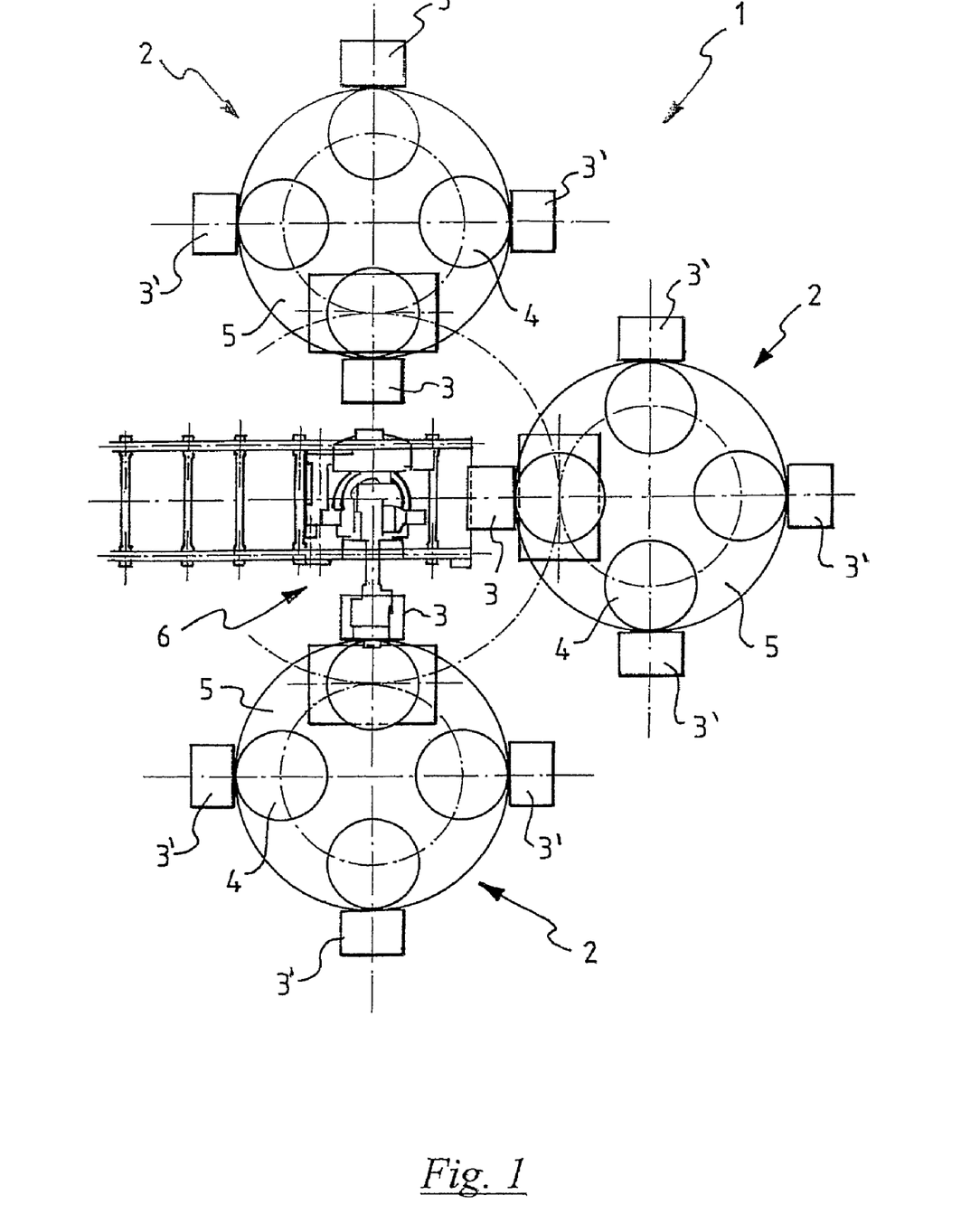
FIG. 1 shows a plan schematic view of a vulcanisation apparatus for vehicle wheel tyres according to a first embodiment of the invention during a step of the method in question.
Figure 2:
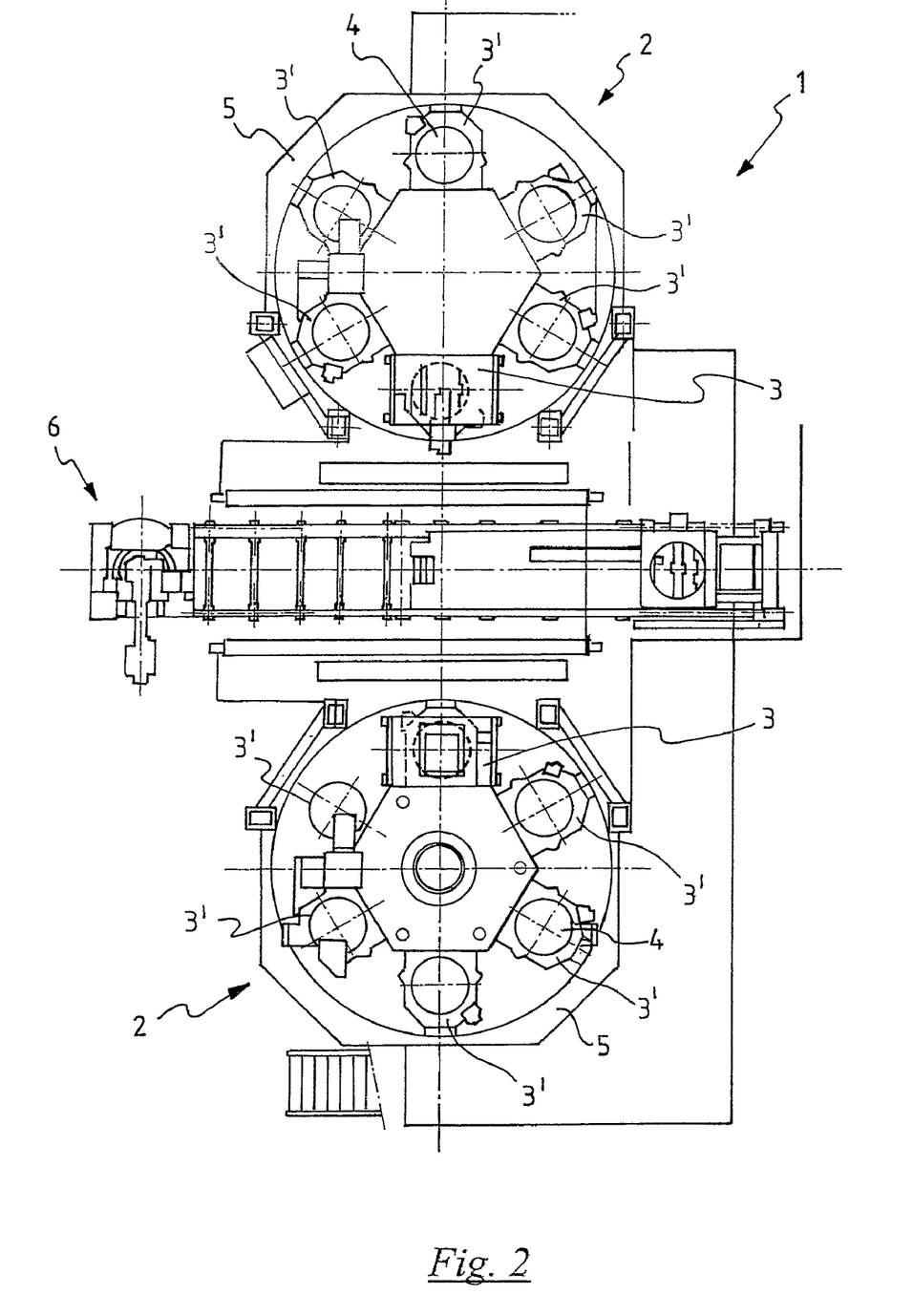
FIG. 2 shows a plan schematic view of a vulcanisation apparatus for vehicle wheel tyres according to a second embodiment of the invention during a step of the method in question.
Figure 3:
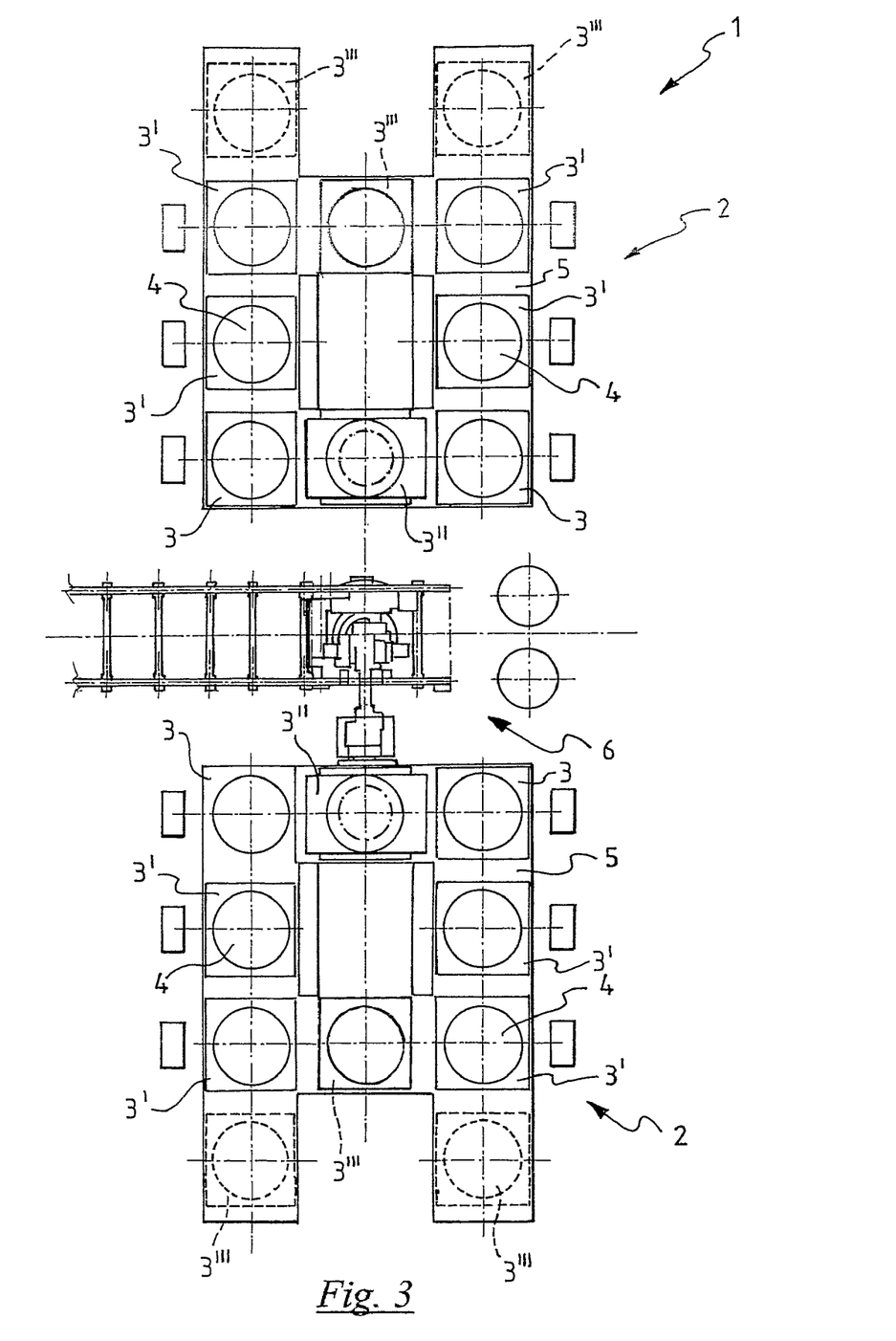
FIG. 3 shows a plan schematic view of a vulcanisation apparatus for vehicle wheel tyres according to a third embodiment of the invention during a step of the method in question.

With reference to FIGS. 1, 2 and 3, by reference numeral 1 has been generally identified a vulcanisation apparatus for vehicle wheel tyres according to the present invention. The vulcanisation apparatus 1 comprises at least one vulcanisation module 2, preferably a plurality of vulcanisation modules 2, wherein a plurality of work stations such as prevulcanisation stations 3, vulcanisation stations 3', and loading and unloading stations 3" is defined. Said work stations are immovable stations and are adapted to house movable vulcanisation molds 4 during the different steps of the vulcanisation method according to the present invention.

In particular, each work station is associated with a vulcanisation mold 4 containing a green tyre being processed during a step of the vulcanisation method.

The vulcanisation molds 4 are preferably airtight and are adapted to house a tyre being processed previously arranged or built on a toroidal support, whose external surface substantially reproduces the internal conformation of the tyre to be obtained. Said vulcanisation molds 4 are provided with devices for passage of working fluids as illustrated for example in the International Patent application published under No. WO 2004/045837, in the name of the same Applicant, which is hereby integrally incorporated by reference.

Each vulcanisation module 2 comprises at least one prevulcanisation station 3 and at least two vulcanisation stations 3'.

Said at least one prevulcanisation station 3 is provided with a supplying device of at least one pressurised primary working fluid, preferably heated, and with a supplying device of at least one pressurised secondary working fluid inside vulcanisation mold 4 temporarily located in the same prevulcanisation station 3.

The pressurised secondary working fluid preferably comprises air, nitrogen or other substantially inert gases, and is adapted to press a radially internal surface of said green tyre towards an external surface of the toroidal support; the pressurised primary working fluid preferably comprises steam and nitrogen or other substantially inert gases, and is adapted to press a radially external surface of the green tyre towards the internal walls of the vulcanisation mold. Said primary and secondary working fluids cooperate in order to carry out a prevulcanisation of the tyre as illustrated for example in the aforesaid International Patent application published under No. WO 2004/045837.

In the present description and in the following claims, the term prevulcanisation refers to at least a partial vulcanisation of the radially innermost layer of the tyre and of the bead region.

On the other hand, each of said at least two vulcanisation stations 3' is provided only with the supplying device of at least one pressurised primary working fluid, preferably heated, inside the vulcanisation mold temporarily located in the same vulcanisation station 3'.

The pressurised primary working fluid preferably comprises steam or other substantially inert gases and is adapted to press said radially external surface of the green tyre towards the internal walls of the vulcanisation mold 4 in order to complete the vulcanisation of the tyre partially vulcanised in the prevulcanisation station 3.

Preferably, the supplying device of said at least one pressurised primary working fluid and the supplying device of said at least one pressurised secondary working fluid of the prevulcanisation station 3 and the supplying device of said at least one pressurised primary working fluid of the vulcanisation station 3' comprise advantageously at least one quick snap-on clutch adapted to rapidly connect the fluid supplying device to the vulcanisation mold 4.

Each mold 4 includes advantageously at least one airtight connector adapted to keep the pressure of said at least one primary working fluid constant inside the mold when the quick snap-on clutch of the supplying device of said pressurised primary working fluid is disconnected.

Furthermore, each vulcanisation module 2 is provided with at least one transfer device 5 adapted to sequentially transfer each vulcanisation mold 4 from one work station to the subsequent one. Said transfer device performs also the function of supporting said vulcanisation molds 4 which are removably connected thereto. Preferably, said at least one transfer device 5 of the vulcanisation molds 4 comprises a turntable which can be driven in rotation, as shown in FIGS. 1 and 2.

Alternatively, the aforesaid at least one transfer device 5 may comprise at least one conveyor belt, not shown in the figures, which is adapted to transfer each vulcanisation mold 4 at the work station wherein the specific operative step to which the tyre is to be subjected is carried out.

According to the present invention, each vulcanisation module 2 is operably associated with at least one moving device 6, adapted to pick up from the same vulcanisation module 2 a vulcanised tyre arranged on a respective toroidal support, and to place in the same vulcanisation module 2 a green tyre previously built on a respective toroidal support. Preferably a single moving device 6 is associated with several vulcanisation modules 2, as shown in the attached figures. In a preferred embodiment, the moving device 6 may comprise at least one robotised arm, for example, such as the type described in the European Patent EP 1 150 829 in the name of the same Applicant, in case with the addition of auxiliary moving devices.

Each vulcanisation module 2 is also provided with at least one mold opening and closing device adapted to open each vulcanisation mold 4 in order to allow the unloading of the vulcanised tyre and the loading of the green tyre and then the closing of the same mold 4.

Preferably, said mold opening and closing device is integrated in said prevulcanisation station 3; alternatively, it may also be integrated in a vulcanisation station 3' (for example the last station of the cycle) or in a loading and unloading station 3".

The present invention provides that the mold opening and closing device cooperates with the moving device 6 in such a way that when the vulcanisation mold 4 is opened by the mold opening and closing device, the moving device 6 picks up the toroidal support with the vulcanised tyre from the vulcanisation module 2 and places the toroidal support with the green tyre on the same vulcanisation module 2.

According to a first embodiment, schematically shown in FIG. 1, the vulcanisation apparatus 1 comprises three vulcanisation modules 2 and, for each vulcanisation module 2, a single prevulcanisation station 3 wherein said mold opening and closing device is integrated and three vulcanisation stations 3'.

According to a second embodiment, schematically shown in FIG. 2, the vulcanisation apparatus 1 comprises two vulcanisation modules 2 and for each of these modules, a prevulcanisation station 3 wherein the said mold opening and closing device is integrated and five vulcanisation stations 3'.

Preferably, in these two first embodiments, said transfer device 5 comprises a turntable.

According to a third embodiment, schematically shown in FIG. 3, the vulcanisation apparatus 1 comprises two vulcanisation modules 2 each one including two prevulcanisation stations 3 and five vulcanisation stations 3'. In this case, it is also comprised at least one loading and unloading station 3" wherein the unloading of vulcanised tyres and the loading of green tyres is carried out. The loading and unloading station 3" cooperates with the moving device 6, and is provided with said mold opening and closing device.

In this embodiment, the transfer device 5 preferably comprises at least one conveyor belt.

While in the first two embodiments of the vulcanisation apparatus 1, each mold 4 stops at each work station of the vulcanisation module 2 in which it is loaded, in the third embodiment two alternative paths are provided for each vulcanisation mold 4. Therefore a mold 4 loaded in the vulcanisation module 2 may be transferred in one of the two prevulcanisation stations 3 present in module 2 and, sequentially, in the three vulcanisation stations 3' which correspond to said prevulcanisation station 3 to be later picked up from module 2.

Obviously it is possible to provide vulcanisation modules 2 that comprise three or more prevulcanisation stations 3 and thus the same number of alternative paths for the vulcanisation molds 4.

In the first two embodiments of the vulcanisation apparatus 1, the tyre loading and unloading operations preferably occur in the prevulcanisation stations 3 or in the vulcanisation stations 3' and therefore they have not been provided any specific loading and unloading stations 3". In these cases, the prevulcanisation station 3 or the vulcanisation station 3' is provided with said mold opening and closing device that cooperates with said moving device 6 to unload a vulcanised tyre and then load a green tyre inside a vulcanisation mold 4.

It is to be noted that the prevulcanisation step wherein the tyre is pressed from the exterior towards the external surface of the toroidal support, in order to obtain through a suitable quantity of supplied heat, at least a partial vulcanisation of the radially internal portion of the tyre (for example of the liner) and of the bead region, has for each tyre model a pre-established execution time which is possibly not able to be divided in subsequent sub-steps. This is due to the fact that because if the tyre, still substantially in a green state, is subject to manipulation and/or interruptions during the aforesaid step, it could have irregularities at then end of the molding and vulcanisation steps caused by unexpected slipping of some layers of elastomer material.

Preferably, the number of the vulcanisation stations 3' present in each vulcanisation module 2 is comprised between 3 and 6. In this manner, in fact, it is possible to obtain the maximum apparatus efficiency because, as stated previously, the prevulcanisation step, which cannot be divided into sub-steps, is much shorter than the vulcanisation step. By providing from 3 to 6 vulcanisation stations 3' for each prevulcanisation station 3, it is possible to obtain the maximum efficiency of all the elements of the vulcanisation apparatus, as it will be explained more clearly in the following.

Optionally, said at least one vulcanisation station 3' may be provided with devices for heating the vulcanisation molds 4.

Also the prevulcanisation station 3 may be optionally provided with devices for heating the vulcanisation molds 4.

Said devices for heating the vulcanisation molds 4 in the prevulcanisation station 3 and in the vulcanisation station 3' may be associated with said supplying device of said pressurised primary working fluid. In particular the primary working fluid may be used for heating the vulcanisation mold 4. Alternatively electrical resistors for this purpose may be provided.

Each vulcanisation module 2 may be provided with mold changing stations 3''', as shown in FIG. 3. These mold changing stations 3''' are adapted to allow the replacement of the vulcanisation mold 4 according to production needs, for example in the case of variations in the size of the tyre to be vulcanised. For example, a work station such as a vulcanisation station 3' may integrate the equipment of a mold changing station 3''' as shown in FIG. 3, where the aforesaid vulcanisation station 3' is located in front of the loading and unloading station 3" in a distal position with respect to the moving device 6.

In different alternative solutions such as those shown in FIGS. 1 and 2, the mold changing station (not shown in these cases) may coincide with one of the prevulcanisation stations 3 or vulcanisation stations 3', or may be adjacent to one of them according to the requirements of the arrangement of the vulcanisation apparatus 1.

With reference to the vulcanisation apparatus 1 shown in the FIGS. 1-3, a preferred embodiment of a vulcanisation method according to the invention will be now disclosed. During a first step a green tyre, positioned or built on a respective toroidal support, is placed inside a vulcanisation mold 4 which may be operably associated with the plurality of work stations defined in the vulcanisation modules 2 of the vulcanisation apparatus 1. Afterwards the vulcanisation mold 4 is closed, preferably by means of the mold opening and closing device.

Consequently, the step of connecting a supplying device of the pressurised primary working fluid, preferably heated, and a supplying device of the pressurised secondary working fluid to the vulcanisation mold 4 at the prevulcanisation station 3, is carried out.

At this point, a radially internal portion of the green tyre on the toroidal support is at least partially vulcanised, by pressing by means of the pressurised secondary working fluid the radially internal surface of the green tyre towards the external surface of the toroidal support and supplying heat to said portion of the tyre preferably by supplying the pressurised primary working fluid inside the toroidal support. It is to be noted that, as shown in WO 2004/045837, in the solution preferred by the Applicant, the secondary working fluid, being adapted to press the radially internal surface of the tyre towards the external surface of the toroidal support, is supplied with a pressure greater than the supply pressure of the primary working fluid, which, during this step is adapted to supply the heat necessary for the aforesaid prevulcanisation.

Afterwards, the tyre molding step is carried out, by disconnecting the supply of the pressurised secondary fluid which is evacuated from the mold 4, continuing with the single supply of the pressurised primary working fluid inside the toroidal support so as to press the radially external surface of the green tyre towards the internal walls of the vulcanisation mold 4. Moreover, during this step, takes place the real vulcanisation of the tyre.

In a following step, the supplying devices of the pressurised primary working fluid and the supplying device of the pressurised secondary working fluid are disconnected from the vulcanisation mold 4 which is transferred to a vulcanisation station 3'.

In this vulcanisation station 3', a supplying device of the pressurised primary working fluid is connected to the vulcanisation mold 4 and therefore the vulcanisation of the tyre, previously prevulcanised and preferably molded, continues by supplying heat to the tyre through the pressurised primary working fluid supplied inside the toroidal support. Furthermore, the primary working fluid presses the radially external surface of the green tyre towards the internal walls of the vulcanisation mold 4.

After the supplying device of the pressurised primary working fluid has been disconnected, the vulcanisation mold 4 is transferred to at least one further vulcanisation station 3' wherein, once the supplying devices of the pressurised primary working fluid have been connected to the vulcanisation mold 4, the vulcanisation is continued according to the same modalities previously described, for a pre-established period of time, after which the supplying device of the pressurised primary working fluid is disconnected from mold 4.

At this point, according to the duration of the previous steps and to the total time required for the tyre to be vulcanised, it may follows the step of opening the mold 4 and unloading the vulcanised tyre, or the step of transferring the mold 4 to a further vulcanisation station 3'.

In other words, if the vulcanisation has been completed, the tyre is unloaded, if, on the contrary, the vulcanisation needs to be completed, they are repeated the steps of: transferring to a vulcanisation station 3'; connecting the supplying device of the pressurised primary working fluid to mold 4; continuing the vulcanisation by supplying the pressurised primary working fluid inside the toroidal support; disconnecting the supplying device of the primary working fluid. Said steps are repeated until the vulcanisation has been completed.

The number of times the steps need to be repeated in order to complete the vulcanisation method is programmed before the vulcanisation method is started up, generally according to manufacturing needs and to the type of tyres to be vulcanised. Consequently a vulcanisation module 2 is provided with an adequate number of vulcanisation stations 3'

Before opening the vulcanisation mold 4 to unload the molded and vulcanised tyre, a transferring step of the vulcanisation mold 4 to a mold loading and unloading station 3", which may be integrated in the prevulcanisation station 3 or in one of the vulcanisation stations 3', may be provided.

As mentioned previously, the opening of the vulcanisation molds is carried out preferably by a mold opening and closing device which is optionally integrated in said prevulcanisation station 3 or vulcanisation station 3', or in a specific loading and unloading station 3". Said mold opening and closing device cooperates with the aforesaid moving devices 6 in such a way that when a vulcanisation mold 4 is opened the moving devices 6 pick up the vulcanised tyre arranged on the respective toroidal support from the vulcanisation module 2 and place a green tyre in the vulcanisation mold 4 inside the same module.

In order to maximise the efficiency of the vulcanisation process according to the present invention, all the vulcanisation molds 4 present in a vulcanisation module 2 in a precise moment are simultaneously transferred from one work station to the subsequent, and in all the work stations of the vulcanisation module 2 the operational step associated with each of them is carried out simultaneously.

With reference to FIG. 1, the operating modes for controlling each vulcanisation module 2 of the vulcanisation apparatus 1, within the scope of the vulcanisation method above illustrated may be summarised as follows. Supposing that the four molds are empty, the moving device 6, for example in the form of a robotised arm, locates a first green tyre inside a first mold in the prevulcanisation station 3 provided with the mold opening and closing device. The first mold is closed and the steps of prevulcanisation, molding and starting the vulcanisation are carried out. When these are completed, the transfer device 5, in the form of a turntable, rotates of a quarter turn bringing the first mold to the first vulcanisation station and bringing a second empty mold to the prevulcanisation station 3. Here, a second green tyre is loaded, and then the steps of prevulcanisation, molding and starting the vulcanisation are started. At the end of these steps, the transfer device 5 rotates of a quarter turn: the first mold reaches the second vulcanisation station, the second mold reaches the first vulcanisation station and a third empty mold is moved to the prevulcanisation station where a third green tyre is loaded. Proceeding in an analogous way, when a fourth mold is loaded and the steps of prevulcanisation, molding and starting vulcanisation of the fourth tyre therein contained are completed, the transfer device 5 brings the fourth mold to the first vulcanisation station and the first mold once again to the prevulcanisation station. Here the moving device 6 in cooperation with the mold opening and closing device, unloads the first tyre by this time vulcanised, and loads a fifth green tyre. The cycle begins again.

The operating modes for controlling each vulcanisation module 2 shown in FIG. 2 within the scope of the vulcanisation method are substantially the same as that described above, with the difference that, since there are five vulcanisation stations 3', the rotation angle of the turntable at the end of each prevulcanisation, molding and starting vulcanisation steps, is smaller: one sixth turn (60°), instead of one quarter turn (90°). Finally, in the case of the same tyre model to be vulcanised, the stop time at each work station is naturally shorter than in the previous case.

With reference to FIG. 3, the operating modes for controlling each vulcanisation module 2 of the vulcanisation apparatus 1, within the scope of the vulcanisation method, may be summarised as follows. Supposing that all the eight molds 4 are empty, the moving device 6 in the form of a robotised arm positions a first green tyre inside a first mold in the loading and unloading station 3" provided with the mold opening and closing device. The first mold is closed and the transfer device 5, for example in the form of a conveyor belt, brings the first mold to a first prevulcanisation station where the steps of prevulcanisation, molding and starting vulcanisation are carried out, while a second mold, preferably arriving from a position frontally opposite to the loading and unloading station 3" (position that may coincide for example with a vulcanisation station also equipped as a mold changing station 3''', as shown in FIG. 3) is moved to the loading and unloading station 3". Here a second tyre is loaded into the second mold, which once it has been closed, is transferred by the conveyor belt to the second prevulcanisation station 3, while a third mold arriving from the previously indicated position (vulcanisation station equipped as a mold changing station 3'''), is transferred to the loading and unloading station 3".

It is to be noted that when the conveyor belt is moving along a row of vulcanisation stations corresponding to the first prevulcanisation station or along a row of vulcanisation stations corresponding to the second prevulcanisation station, all the molds are moved in to the adjacent station and the mold which is in the distal position with respect to the prevulcanisation station of its own row, is placed by the conveyor belt in the position frontally opposite to the loading and unloading station 3", a position which, as already illustrated, preferably coincides with a vulcanisation station equipped as a mold change station 3'".

A third green tyre is then placed into a third mold, the mold is closed and transferred by the conveyor belt towards the first prevulcanisation station while the first mold, having completed the steps of prevulcanisation, molding and starting vulcanisation, is moved to the first of the vulcanisation stations 3'. At the same time, the conveyor belt moves a fourth mold to the loading and unloading station 3". The cycle continues until the first mold, having reached the aforesaid vulcanisation station frontally opposite to the loading and unloading station 3", completes the vulcanisation of the first tyre contained therein. At this point an eighth mold is moved towards the second prevulcanisation station, while the first mold returns to the loading and unloading station 3" where the robotised arm, in cooperation with the mold opening and closing device of the loading and unloading station 3" unloads the first vulcanised tyre and loads the ninth green tyre. The cycle is repeated.

It is to be noted that the herein illustrated control of each vulcanisation module 2, is provided only as an example for a running system. In fact, different manufacture needs, such as the changing of one or more molds, for example, would result in some procedural differences in the illustrated sequences, without however modifying the vulcanisation method according to the invention.

Preferably the vulcanisation mold 4 stops at each work station for periods that are substantially equal one to the other.

It is to be noted that in the present description and the following claims the duration of two periods of time are considered "substantially" equal when the difference between them is shorter than a prime minute.

Since the technological limit of maximum efficiency of the vulcanisation method and of the apparatus necessary for carrying said method, lies substantially in the duration of the prevulcanisation step, which cannot be divided into substeps, varying out a vulcanisation method wherein the vulcanisation mold 4 stops at each work station for a period equal to the prevulcanisation time, it is possible to maximise the efficiency of the aforesaid method.

In this case the molding step, following the prevulcanisation step, is delayed and carried out in a vulcanisation station 3', still pressing a radially external surface of the green tyre towards the internal walls of the vulcanisation mold 4 by supplying said pressurised primary working fluid inside the toroidal support.

A preferred embodiment of the method according to the present invention provides that said stop times of the vulcanisation mold 4 in each work station, which are substantially equal one to the other, are comprised between about 3 minutes and about 10 minutes. Obviously said stop times depend on the total vulcanisation time required by the tyre to be manufactured and on the number of the vulcanisation stations 3'.

In other words, considering that the total vulcanisation time of a tyre is generally comprised between 18 and 30 minutes, and therefore evaluating an average total time of 24 minutes, it is correct to estimate a stop time of the mold 4 in the various work stations in about 6 minutes and a vulcanisation apparatus 1 of the type shown in FIG. 1. In this way, all the different steps of the method are carried out in the work stations substantially simultaneously, and the maximum performance degree of the apparatus and the method according to the present invention is thus obtained, substantially reducing the block times in each work station.

A second embodiment provides that the mold 4 stops at each work station for different periods which are to be established according to the requirements of the tyre to be obtained.

Preferably the vulcanisation mold 4 stops in the prevulcanisation station 3 for a period ranging from 3 minutes to 10 minutes, and in the vulcanisation station 3' for a period ranging in the same interval.

In the embodiments wherein a step of transferring the mold 4 to a loading and unloading station 3" is provided, said mold 4 stops in said station 3" for a period preferably ranging from 1 minute to 3 minutes.

Once the period that the mold 4 remains in each of the various work stations has been established, it is possible to optimise the vulcanisation apparatus and method according to the present invention, also by means of an appropriate number of vulcanisation modules 2 according to the manufacture requirements.

In the scope of the present previous description and the following claims, all the numerical measurements indicating quantity, parameters, percentages, etc, are to be considered as preceded by the term "about", unless otherwise specified. Furthermore, all the intervals of numerical measurement include all the possible combinations of the maximum and minimum numerical values, as well as all the possible intermediate intervals, as well as those specifically indicated in the text.

The invention claimed is:

1. A vulcanisation method for vehicle wheel tyres comprising:
    a) enclosing a green tyre, arranged on a toroidal support, inside a vulcanisation mold which may be operably associated with a plurality of work stations defined in at least one vulcanisation module;
    b) providing a prevulcanisation station configured to receive both a supply device of at least one pressurised primary working fluid and a supply device of at least one pressurised secondary working fluid;
    c) connecting the supply device of the at least one pressurised primary working fluid and the supply device of the at least one pressurised secondary working fluid to the vulcanisation mold in the prevulcanisation station;
    d) at least partially vulcanising a radially internal portion of the green tyre on the toroidal support by pressing a radially internal surface of said green tyre toward an external surface of the toroidal support by means of said at least one pressurised secondary working fluid, and supplying heat to said portion of the tyre;
    e) molding and continuing the vulcanisation of the tyre by supplying the at least one pressurised primary working fluid inside the toroidal support, pressing a radially external surface of the green tyre toward the internal walls of the vulcanisation mold;
    f) disconnecting from the vulcanisation mold the supply device of said at least one pressurised primary working fluid and the supply device of said at least one pressurised secondary working fluid;
    g) transferring the mold to a first of a plurality of vulcanisation stations, each of the plurality of vulcanisation stations configured to receive only a respective supply device of the at least one pressurised primary working fluid;
    h) connecting the respective supply device of the at least one pressurised primary working fluid to the vulcanisation mold in said first vulcanisation station;
    i) continuing the vulcanisation of the molded and prevulcanised tyre during steps d) and e), by supplying said at least one pressurised primary working fluid inside the toroidal support, pressing the radially external surface of the green tyre toward the internal walls of the vulcanisation mold and supplying heat to the tyre;

j) disconnecting the respective supply device of said at least one pressurised primary working fluid;

k) transferring the mold to a second of the plurality of vulcanisation stations;

l) carrying out steps h), i), j) and in case k) until the vulcanisation method has been completed; and m) opening said mold and unloading the vulcanised tyre from the vulcanisation mold, wherein a total time that the mold is located in all of the plurality of vulcanisation stations is substantially equal to a time to complete vulcanisation of the tyre, and a time that the mold is located in each of the plurality of vulcanisation stations is substantially equal to a time that the mold is located in the prevulcanisation station.

2. The vulcanisation method for vehicle wheel tyres according to claim 1, wherein steps a), b) and m) are carried out in the prevulcanisation station.

3. The vulcanisation method for vehicle wheel tyres according to claim 1, further comprising transferring the vulcanisation mold from a loading and unloading station to the prevulcanisation station and from a vulcanisation station to the loading and unloading station.

4. The vulcanisation method for vehicle wheel tyres according to claim 3, wherein steps a), b) and m) are carried out in said loading and unloading station.

5. The vulcanisation method according to claim 1, wherein the heat supplied to said radially internal portion of the green tyre in step d) is supplied by said at least one pressurised primary working fluid fed inside said toroidal support.

6. The vulcanisation method according to claim 1, wherein the heat supplied to said green tyre in vulcanisation step i), is supplied by said at least one pressurised primary working fluid fed inside said toroidal support.

7. The vulcanisation method according to claim 1, wherein step e) is carried out between step h) and step i).

8. The vulcanisation method according to claim 1, wherein the vulcanisation mold stops at each work station for a stop time of about 3 minutes to about 10 minutes.

9. The vulcanisation method according to claim 3, wherein the vulcanisation mold stops in the loading and unloading station for about 1 to about 3 minutes.

10. The vulcanisation method according to claim 1, wherein the vulcanisation mold stops in the prevulcanisation station for about 3 to about 10 minutes.

11. The vulcanisation method according to claim 1, wherein the vulcanisation mold stops in each vulcanisation station for about 3 to about 10 minutes.

12. The vulcanisation method according to claim 1, wherein said primary working fluid comprises steam.

13. The vulcanisation method according to claim 1, wherein said primary working fluid comprises an inert gas.

14. The vulcanisation method according to claim 1, wherein said secondary working fluid comprises an inert gas.

* * * * *